United States Patent [19]
Achour

[11] Patent Number: 6,061,408
[45] Date of Patent: May 9, 2000

[54] METHOD AND APPARATUS FOR 45° PHASE AMBIGUITY RESOLUTION FOR ONE CODED BIT PER SYMBOL 8PSK MODULATION

[75] Inventor: Maha Achour, San Diego, Calif.

[73] Assignee: Tiernan Communications, Inc., San Diego, Calif.

[21] Appl. No.: 09/293,251

[22] Filed: Apr. 16, 1999

Related U.S. Application Data

[60] Provisional application No. 60/082,200, Apr. 17, 1998.

[51] Int. Cl.$^7$ ..................................................... H04L 5/12
[52] U.S. Cl. ......................... 375/265; 375/280; 375/262; 714/792
[58] Field of Search ..................................... 375/265, 262, 375/280, 380, 329; 714/786, 792, 795

[56] References Cited

U.S. PATENT DOCUMENTS

| | | | |
|---|---|---|---|
| 5,233,630 | 8/1993 | Wolf | 375/308 |
| 5,428,631 | 6/1995 | Zehavi | 375/308 |
| 5,469,452 | 11/1995 | Zehavi | 371/43 |
| 5,497,401 | 3/1996 | Ramaswamy et al. | 375/341 |
| 5,757,856 | 5/1998 | Fang | 375/265 |
| 5,832,001 | 11/1998 | Choi | 371/43.2 |
| 5,844,922 | 12/1998 | Wolf et al. | 371/43.1 |
| 5,878,085 | 3/1999 | McCallister et al. | 375/280 |

OTHER PUBLICATIONS

Tadashi Wadayama et al.; AN 8–Dimensional Trellis–Coded 8–PSK With Non–Zero Crossing Constraints; IEICE Transactions on Fundamentals of Electronics, Communications and Computer Sciences; vol. E77–A, No. 8; pp. 1274–1280; Aug. 1994.

Gottfried Ungerboeck; Channel Coding With Multilevel/Phase Signals; IEEE Transactions on Information Theory; vol. IT–28, No. 1, pp 55–67; Jan. 1982.

Thomas Woerz and Robert Schweikert; Performance of Punctured Pragmatic Codes; IEEE Global Telecommunications Conference GLOBECOM '95; pp. 664–669; Nov. 1995.

Andrew J. Viterbi et al.; A Pragmatic Approach to Trellis–Coded Modulation; IEEE Communications Magazine; pp 11–19; Jul. 1989.

Xinyu Ma and Chrysostomas L. Nikias; Parameter Estimation and Blind Channel Identification in Impulsive Signal Environments; IEEE Transactions on Signal Processing; vol. 43 No. 12; pp. 2884–2897; Dec. 1995.

Jack Keil Wolf and Ephraim Zehavi; $p^2$ Codes: Pragmatic Trellis Codes Utilizing Punctured Convolutional Codes; IEEE Communications Magazine; pp. 94–99; Feb. 1995.

Qualcomm Inc. ASIC Products; Q1900 Viterbi/Trellis Decoder; Forward Error Correction Products Data Book, 80–24128–1; pp. 1–1 to 1–16; Feb. 1997.

Deborah Stranton and Jack Wolf; "High Rate Punctured Trellis Codes" QUALCOMM Incorporated, ASIC Products; As presented at Wireless Symposium Exhibition; pp. 1–7; Feb. 10, 1998.

*Primary Examiner*—Temesghen Ghebretinsae
*Attorney, Agent, or Firm*—Hamilton, Brook, Smith & Reynolds, P.C.

[57] ABSTRACT

A method and apparatus for 45° phase ambiguity resolution for one coded bit per symbol 8PSK modulation resolves phase ambiguity by selection of pre-differential encoders. A trellis encoder for 8PSK modulation of the type in which input data bits are encoded to a three-bit symbols includes a differential encoder, a convolutional encoder and first and second encoding assemblies. A decoder for decoding trellis coded data of 8PSK modulation includes a Viterbi decoder, a differential decoder, a convolutional decoder and first and second decoder assemblies. Each of the encoding and decoding assemblies includes multiplexing logic for selecting from among possible data paths according to a phase invariant scheme.

19 Claims, 4 Drawing Sheets

METHOD AND APPARATUS FOR 45° PHASE AMBIGUITY RESOLUTION FOR ONE CODED BIT PER SYMBOL 8PSK MODULATION

RELATED APPLICATION

This application claims priority to U.S. Provisional Application Ser. No. 60/082,200 filed Apr. 17, 1998, the entire teachings of which are incorporated herein by reference.

BACKGROUND OF THE INVENTION

Trellis-coded modulation (TCM) combines channel coding and modulation at a transmitter. Information bits are sent into a TCM encoder in parallel. The least-significant bits (LSBs) are convolutionally encoded. The most-significant bits (MSBs) are usually left uncoded and combined with the output of the convolutional coder to form a symbol on a signal constellation through a signal mapper. One advantage of TCM is that although no error control coding is performed on any bit other than the LSB of the input information data, the decoder is able to provide error correction on all bits. Therefore, significant coding gain over uncoded modulation can be achieved.

In eight-state phase shift keying (8PSK) modulation, a modulated carrier signal is transmitted with symbols that each represent three data bits. A difficulty with PSK transmission is that the modulated carrier as transmitted can be affected by undesirable phase rotation. At the receiver, such phase rotation corresponds to a rotation of the received signal constellation such that decoded symbols do not match those which were transmitted.

It is known to provide resolution of the phase ambiguities for $\frac{2}{3}$, $\frac{5}{6}$ and $\frac{8}{9}$ trellis coded 8PSK modulation schemes in which the modulation is based on two coded bits per symbol. Such known approaches enable 90°, 180° and 270° phase ambiguities to be resolved.

SUMMARY OF THE INVENTION

The present invention provides a method and apparatus for 45° phase ambiguity resolution for one coded bit per symbol 8PSK modulation. The phase ambiguity is resolved by novel selection of a pre-differential encoder.

According to the present invention, a trellis encoder for 8PSK modulation of the type wherein a set of input data bits are encoded to three-bit symbols includes a first differential encoder, a convolutional encoder and first and second encoding assemblies. The first differential encoder has an input for receiving a first data bit of the set of input data bits. The convolutional encoder has an input connected to an output of the first differential encoder, and first and second convolutional encoder outputs. Each of the first and second encoding assemblies includes first and second multiplexers, and second and third differential encoders. The first multiplexer has a data input for receiving a pair of data bits of the set of input data bits with one of the pair of data bits preceding another of the pair of data bits in time, first and second select inputs respectively connected to the first and second convolutional encoder outputs, and a pair of outputs. The second differential encoder has an input connected to one of the first multiplexer outputs and the third differential encoder has an input connected to another one of the first multiplexer outputs. The second multiplexer has a pair of data inputs each respectively connected to a different one of the second and third differential encoder outputs, first and second select inputs respectively connected to the first and second convolutional encoder outputs, and an output.

According to an aspect of the invention, the multiplexers of the first encoding assembly are responsive to connect certain input data bits for coding by one of the second and third differential encoders based on the binary levels of the first and second convolutional encoder outputs.

According to another aspect of the invention, the multiplexers of the second encoding assembly are responsive to connect certain other input data bits for coding by one of the second and third differential encoders based on the binary levels of the first and second convolutional encoder outputs and the second multiplexer output of the first encoding assembly.

Further in accordance with the invention, a decoder for decoding trellis coded data of the type wherein input data bits are encoded to three-bit symbols in 8PSK modulation includes a Viterbi decoder, a first differential decoder, a convolutional encoder and first and second decoder assemblies. The Viterbi decoder provides an estimate of a first coded bit from a received phase point signal. The first differential decoder has an input for receiving the first coded bit estimate. The convolutional encoder has an input for receiving the first coded bit estimate, and first and second convolutional encoder outputs. Each of the first and second decoding assemblies includes first and second multiplexers, and second and third differential decoders. The first multiplexer has a data input for receiving a pair of second bit estimates, first and second select inputs respectively connected to the first and second convolutional encoder outputs, and a pair of outputs. The second differential decoder has an input connected to one of the first multiplexer outputs. The third differential decoder has an input connected to another of the first multiplexer outputs. The second multiplexer has a pair of data inputs each respectively connected to a different one of the second and third differential encoder outputs, first and second select inputs respectively connected to the first and second convolutional encoder outputs, and an output.

An advantage of the phase ambiguity resolution approach of the present invention is that less time is needed to acquire signal synchronization since sector rotation is avoided. This approach balances better phase resolution performance with fewer coded bits per symbol and has application to punctured and unpunctured trellis coded modulation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
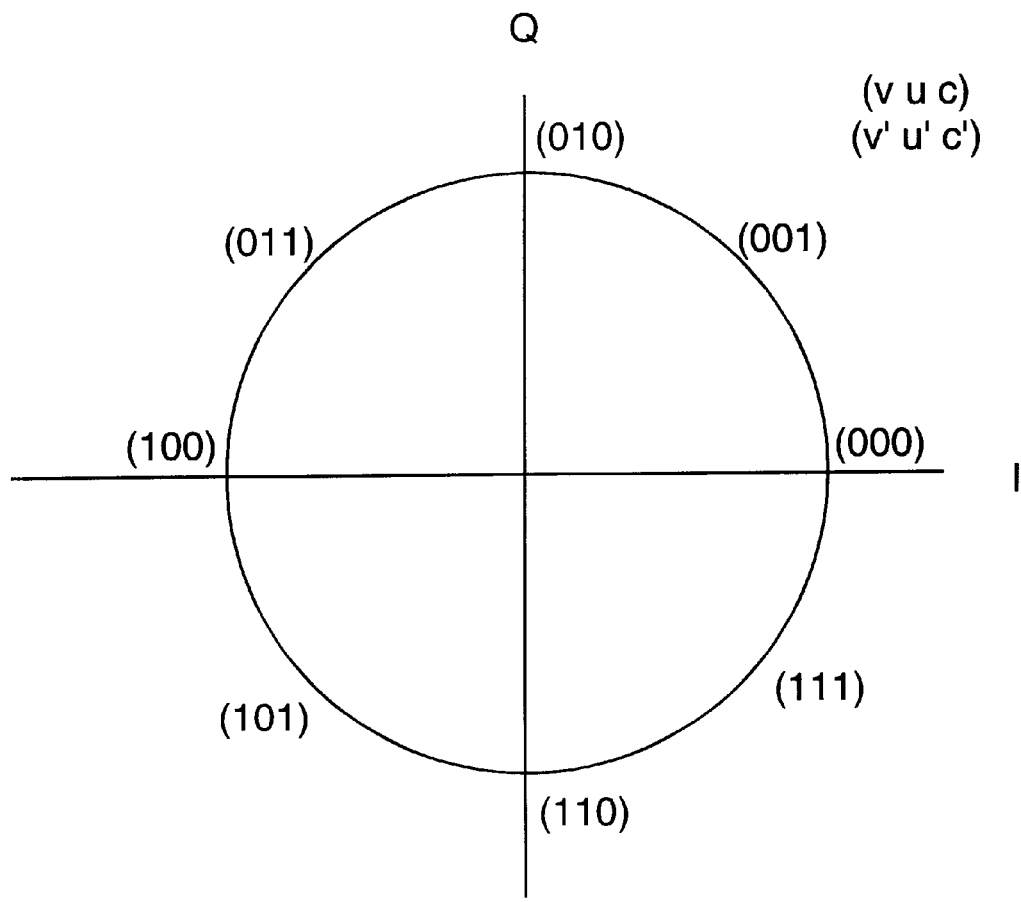
FIG. 1 shows a signal constellation for 8PSK modulation.

The principles of the present invention are now described with reference to FIGS. 1 to 5. FIG. 1 illustrates a particular signal constellation for 8PSK in which the symbol mapping is arranged for one coded bit per symbol. In particular, a three-bit symbol (v u c) mapping that defines the 8 PSK one coded bit per symbol is shown. The notation (v'u'c') is used further herein to indicate a symbol succeeding symbol (vuc), where it can be seen that v and v' represent the most significant bits and c and c' represent the least significant bits. Each of the three-bit symbols corresponds to a particular carrier phase shift as shown in Table 1 below:

TABLE 1

| Bits | 000 | 001 | 010 | 011 | 100 | 101 | 110 | 111 |
|---|---|---|---|---|---|---|---|---|
| Phase Shift | 0° | 45° | 90° | 135° | 180° | 225° | 270° | 315° |

It is apparent from FIG. 1 that a 45° phase rotation leads to the following transformation as indicated in Table 2 below:

TABLE 2

| | 45° rotation transformation |
|---|---|
| c = 0 | vuc → vu (c⊕1) |
| c = 1 | vuc → v (u⊕1)(c⊕1) if u = 0 |
| | vuc → (v⊕1)(u⊕1)(c⊕1) if u = 1 |

The same transformations hold for the primed symbol (v'u'c'). The transformations in Table 2 can be written as follows:

for c=1, U=(v u)$_{decimal}$→Ũ=(U+1) mod [4].

For example, the symbol (v u c)=(101) becomes (110) after a 45° phase rotation, i.e., U =(10)$_{decimal}$=2 is transformed to Ũ=(U+1) mod [4]=3=(11)$_{decimal}$.

Figure 2:
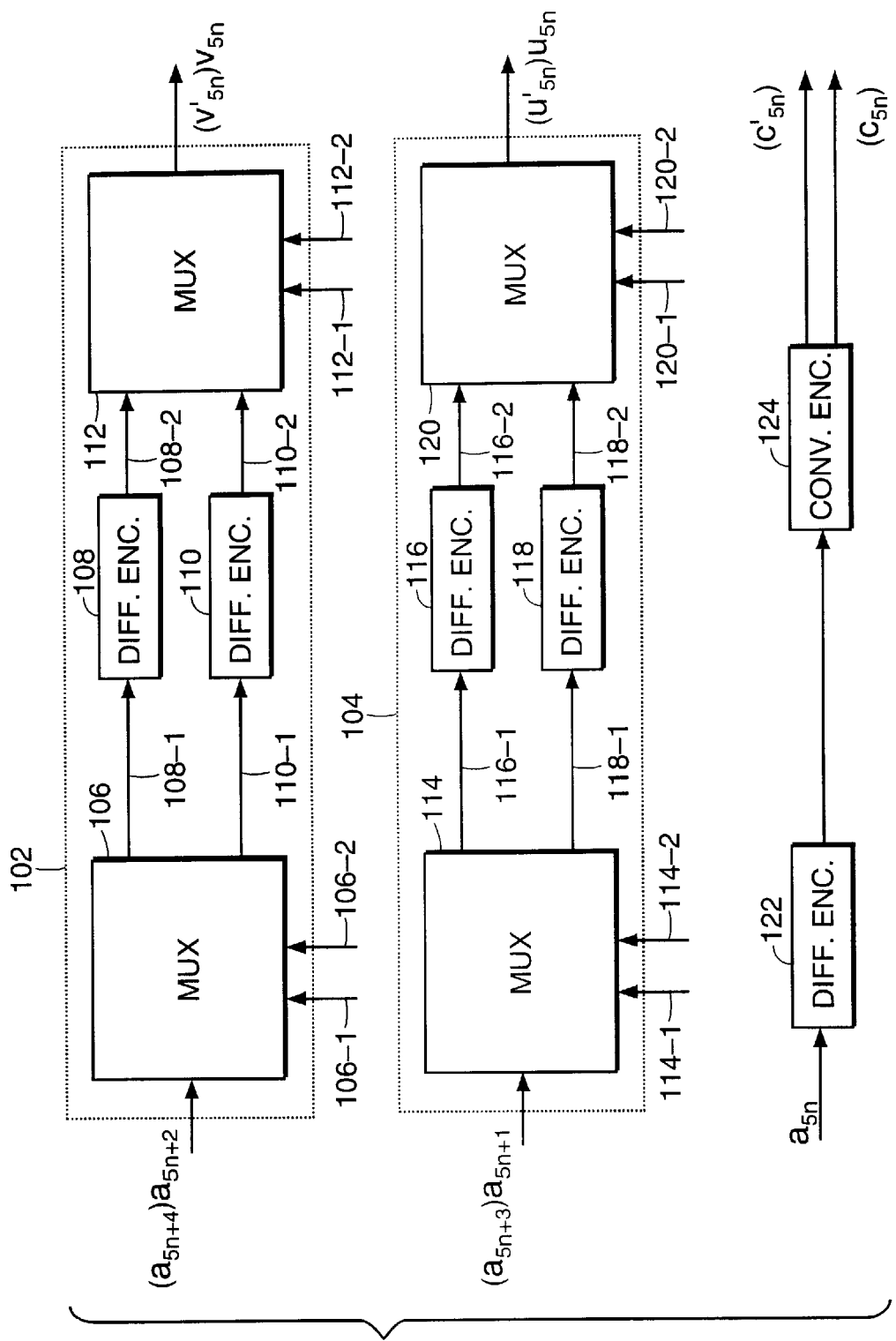
FIG. 2 shows a block diagram of a rotationally invariant encoder for 8PSK modulation in accordance with the present invention.
Figure 3:
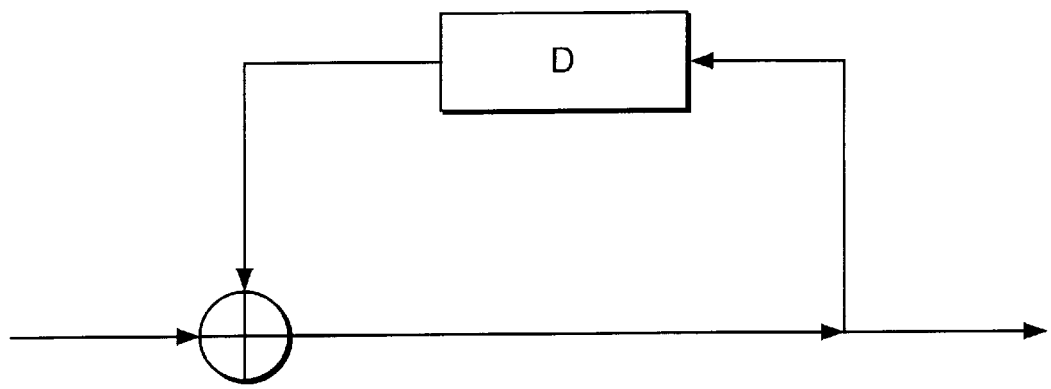
FIG. 3 shows a circuit block diagram of a differential encoder for use in the encoder of FIG. 2.
Figure 5:
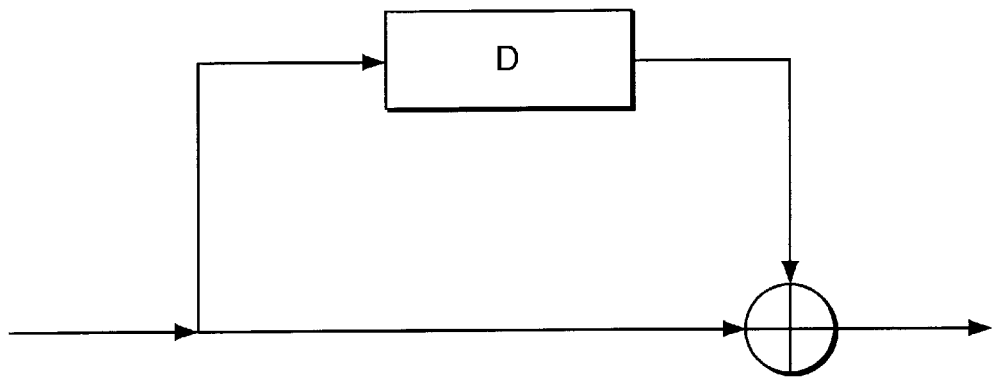
FIG. 5 shows a circuit block diagram of a differential decoder for use in the decoder of FIG. 4.

Referring now to FIG. 2, a block diagram of an embodiment of a 45° phase invariant 8PSK encoder is shown. The encoder comprises a pair of encoding assemblies 102, 104, a differential encoder 122 and a convolutional encoder 124. The encoding assembly 102 includes a pair of multiplexers 106, 112 and a pair of differential encoders 108, 110 connected between the multiplexers. Like-vise, the encoding assembly 104 includes a pair of multiplexers 114, 120 and a pair of differential encoders 116, 118 connected between the multiplexers. The differential encoder 122 has an output connected to an input of the convolutional encoder 124. The differential encoders 108, 110, 116, 118, 122 are binary differential encoders of the type shown in FIG. 3. Referring again to FIG. 2, the convolutional encoder 124 is preferably a conventional rate ½ convolutional encoder, though it can also comprise a rate (n/n+1) convolutional encoder for punctured coding schemes.

The encoding operation for rate ⅘ TCM for a set of information bits $a_{5n+k}$, where n≧0 and 4≧k≧0 is now described. Bit $a_{5n}$ is input to differential encoder 122 and the output of encoder 122 is then encoded using the rate ½ convolutional encoder 124. The coded bits output from the convolutional encoder 124 are designated as (c'$_{5n}$c$_{5n}$). Bits $a_{5n+1}$, $a_{5n+2}$, $a_{5n+3}$, and $a_{5n+4}$ are referred to as uncoded bits since such bits are not convolutionally encoded. The uncoded bits $a_{5n+1}$, $a_{5n+2}$, $a_{5n+3}$, $a_{5n+4}$ are differentially pre-encoded by the encoding assemblies 102, 104 to resolve the 45° phase ambiguity. More particularly, uncoded bits $a_{5n+2}$, $a_{5n+4}$ are successively differentially encoded by the encoding assembly 102 while uncoded bits $a_{5n+1}$, $a_{5n+3}$ are successively differentially encoded by the encoding assembly 104. The output bits from the encoding assemblies 102, 104 are denoted by $v_{5n}$, v'$_{5n}$ and u$_{5n}$ and u'$_{5n}$ respectively. The three-bit symbols are constructed as (v$_{5n}$u$_{5n}$c$_{5n}$) and (v'$_{5n}$u'$_{5n}$c'$_{5n}$). It can be seen that each such three-bit symbol includes one coded bit per symbol, namely respective coded bits c$_{5n}$, c'$_{5n}$.

From FIG. 2 it can also be seen that the three information streams have different rates. For instance, if the information rate is denoted by inf_rate, then the input bit rate of the $a_{5n}$ path is equal $$\frac{\text{inf\_rate}}{5},$$

and the input bit rate of the other two paths is equal $$2 \times \frac{\text{inf\_rate}}{5}.$$

Therefore, the output bit rate on each of the three output paths is equal to $$2 \times \frac{\text{inf\_rate}}{5}.$$

The particular logic by which the encoding assemblies select among possible paths is now described. As shown in FIG. 2, the multiplexers 106, 112, 114 and 120 have respective select inputs 106-1, 106-2, 112-1, 112-2, 114-1, 114-2, 120-1, 120-2.

Multiplexers 106, 114 are conventional 1:2 multiplexers. Multiplexers 112, 120 are conventional 2:1 multiplexers. The signals that are presented on these select inputs include the uncoded bits u$_{5n}$, u'$_{5n}$ and coded bits c$_{5n}$, c'$_{5n}$. In particular, for encoding assembly 102, multiplexers 106, 112 select a path from paths 108-1, 108-2 and 110-1, 110-2 according to the following logic:

If {(c'=0) c=0} or if {(c'=1) c=1&(u'=0) u=0} then path 108-1, 108-2 is 10 selected.

If {(c'=1) c=1&(u'=1) u=1 } then path 110-1, 110-2 is selected.

For encoding assembly 104, multiplexers 114, 120 select a path from paths 116-1, 116-2 and 118-1, 118-2 according to the following logic:

If {(c'=0) c=0} then path 116-1, 116-2 is selected.

If {(c'=1) c=1} then path 118-1, 118-2 is selected.

Next, it can be seen that the differential pre-encoding provided by the encoding assemblies 102, 104 indeed resolves any 45° phase ambiguity rotation. First consider that it is desirable to differentially pre-encode the bit that can flip (110) value when it is rotated by 45°. As indicated in Table 2, the information bits are pre-coded as follows:

1. Bit c$_{5n}$ always transforms to (c$_{5n}$⊕1). Therefore, the information bit a$_{5n}$ should always be differentially pre-encoded.

2. The uncoded bit a$_{5n+1}$ is differentially pre-encoded with the previous bits a$_{5m+1}$ or a$_{5m'+3}$, where m and m' are less than n, provided that c$_{5n}$=c$_{5m}$ or c'$_{5n}$=c'$_{5m'}$, respectively.

3. The uncoded bit a$_{5n+3}$ is differentially pre-encoded with the previous bits a$_{5m+1}$ or a$_{5m'+3}$ where m and m' are less than n, provided that c'$_{5n}$=c$_{5m}$ or c'$_{5n}$=c$_{5m'}$, respectively.

4. The uncoded bit a$_{5n+2}$ is differentially pre-encoded with the previous bits a$_{5m+2}$ or a$_{5m'+4}$, where m and m' are less than n, provided that $\{c_{5n}=c_{5m}$ and $u_{5n}=u_m\}$ or $\{c_{5n}=c'_{5m'}$ and $u_{5n}=u'_{5m'}\}$, 5. The other uncoded bit $a_{5n+4}$ is differentially pre-encoded with the previous bits $a_{5m+2}$ or $a_{5m'+4}$, where m and m' are less than n, provided $\{c'_{5n}=c_{5m}$ or $u'_{5n}=u_{5m}\}$ and $\{c'_{5n}=c'_{5m'}$ or $u'_{5n}=u'_{5m'}\}$, respectively.

Figure 4:
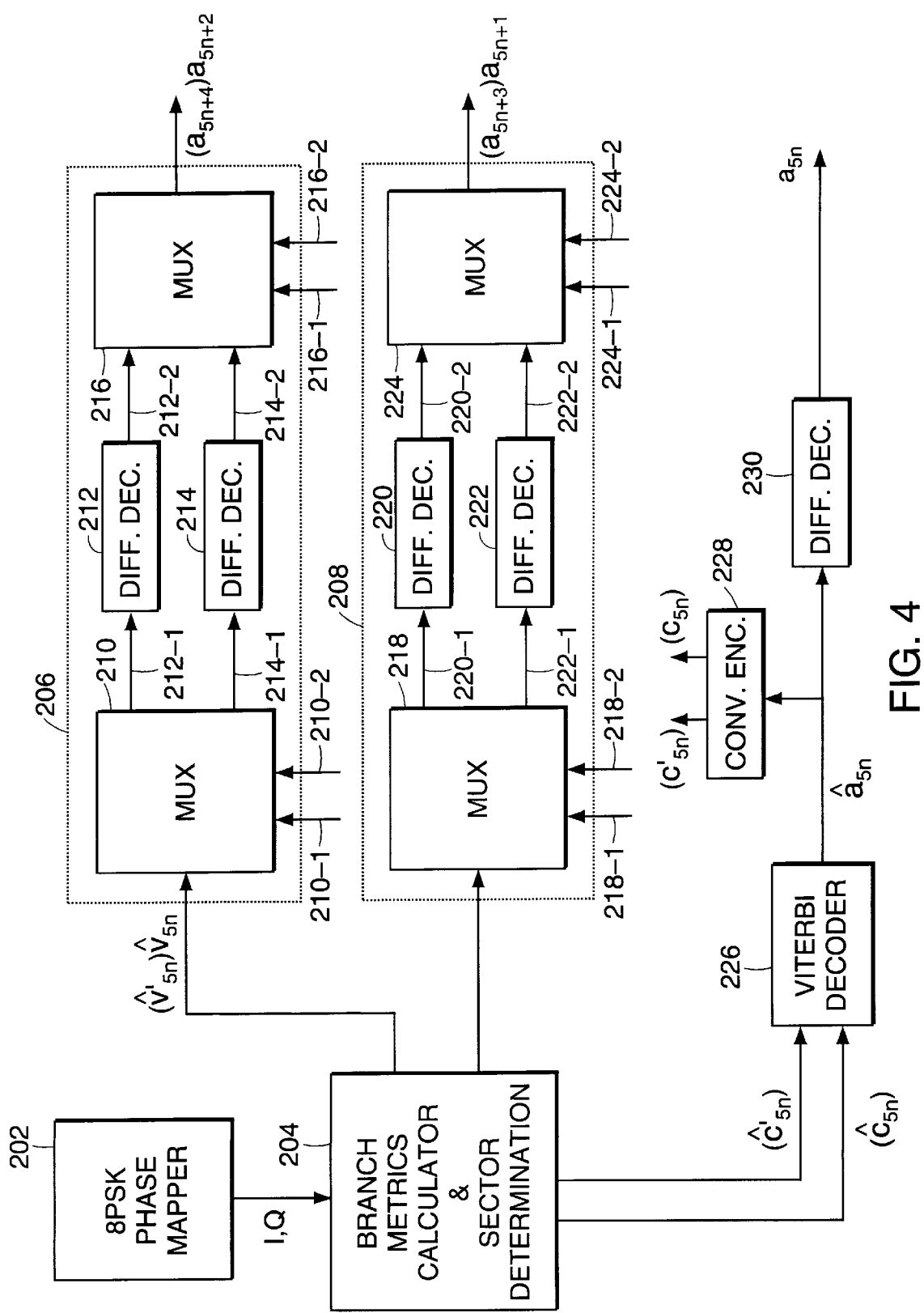
FIG. 4 shows a block diagram of a rotationally invariant decoder for 8PSK modulation in accordance with the present invention.

Referring now to FIG. 4, a block diagram of an embodiment of a 45° phase invariant 8PSK decoder is shown. The decoder includes 8PSK phase mapper 202, branch metrics calculator & sector determination block 204, a pair of decoding assemblies 206, 208, a Viterbi decoder 226, a convolutional encoder 228 and a differential decoder 230. The decoding assembly 206 includes a pair of multiplexers 210, 216 and a pair of differential decoders 212, 214 connected between the multiplexers. Likewise, the decoding assembly 208 includes a pair of multiplexers 208, 224 and a pair of differential decoders 220, 222 connected between the multiplexers. The differential decoder 230 has an input connected to the output of Viterbi decoder 226. The differential decoders 212, 214, 220, 222, 230 are binary differential decoders of the type shown in FIG. 5. Referring again to FIG. 4, the convolutional encoder 228 is a conventional rate ½ convolutional encoder or alternatively a rate n/(n+1) convolutional encoder for punctured codes which also connects to the output of Viterbi decoder 226.

Phase mapper 202 receives signals that have been transmitted as 8PSK signals as described above. The received signals are converted to quantized I and Q components which are provided to branch metrics calculator & sector determination block 204. Block 204 provides sector values and branch metrics corresponding to estimates for $v_{5n}$, $v'_{5n}$, $u_{5n}$, $U'_{5n}$, $c_{5n}$, $c'_{5n}$, to the decoding assemblies 206, 208 and Viterbi decoder 226. Note that since the coding of the present invention provides 45° phase ambiguity resolution, a sector rotation is not required.

A decoded bit estimate $a_{5n}$ from Viterbi decoder 226 is re-encoded by the convolutional encoder 228 to deduce bits $c_{5n}$ and $c'_{5n}$. Coded bits $c_{5n}$ and $c'_{5n}$ are used with decoding assembly 208 to differentially decode the bits $u_{5n}$ and $u'_{5n}$, respectively. The bits $v_{5n}$ and $v'_{5n}$ are decoded in decoding assembly 206 using the bits $\{c_{5n}$ and $u_{5n}\}$ and $\{c'_{5n}$ and $u'_{5n}\}$, respectively. Thus, the decoder provides decoded bits $a_{5n}$, $a_{5n+1}$, $a_{5n+2}$, $a_{5n+3}$, $a_{5n+4}$.

The particular logic by which the decoding assemblies select among possible paths is now described. As shown in FIG. 4, the multiplexers 210, 216, 218, 224 have respective select inputs 210-1, 210-2, 216-1, 216-2, 218-1, 218-2, 2241, 2242. Multiplexers 210, 218 are conventional 1:2 multiplexers. Multiplexers 216, 224 are conventional 2:1 multiplexers. The signals that are presented on these select inputs include the uncoded bits $u_{5n}$, $u'_{5n}$ and coded bits $c_{5n}$, $c'_{5n}$. In particular, for decoding assembly 206, multiplexers 210, 216 select a path from paths 212-1, 212-2 and 214-1, 214-2 according to the following logic:

If $\{(c'=1)\ c=1\}$ or if $\{(c'=0)\ c=0\&(u'=1)\ u=1\}$ then path 212-1, 212-2 is selected.

If $\{(c'=0)\ c=0\&(u'=0)\ u=0\}$ then path 214-1, 2142 is selected.

For decoding assembly 208, multiplexers 218, 224 select a path from paths 220-1, 220-2 and 222-1, 222-2 according to the following logic:

If $\{(c'=0)\ c=0\}$ then path 220-1, 220-2 is selected.

If $\{(c'=1)\ c=1\}$ then path 222-1. 222-2 is selected.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A trellis encoder for 8PSK modulation of the type wherein input data bits are encoded to three-bit symbols, the encoder comprising:

a first differential encoder having an input for receiving a first data bit of a set of input data bits;

a convolutional encoder having an input connected to an output of the first differential encoder, and first and second convolutional encoder outputs; and first and second encoding assemblies, each encoding assembly comprising:

a first multiplexer having a data input for receiving a pair of data bits of the set of input data bits, one of the pair of data bits preceding another of the pair of data bits in time, first and second select inputs respectively connected to the first and second convolutional encoder outputs, and a pair of outputs;

a second differential encoder having an input connected to one of the first multiplexer outputs;

a third differential encoder having an input connected to another one of the first multiplexer outputs;

a second multiplexer having a pair of data inputs each respectively connected to a different one of the second and third differential encoder outputs, first and second select inputs respectively connected to the first and second convolutional encoder outputs, and an output.

2. The encoder of claim 1 wherein the multiplexers of the first encoding assembly are responsive to connect certain input data bits for coding by one of the second and third differential encoders based on the binary levels of the first and second convolutional encoder outputs.

3. The encoder of claim 2 wherein the first encoding assembly receives a second data bit and a fourth data bit of a set of five input data bits, the second data bit preceding the fourth data bit in time, and wherein (1) for the second data bit, the first and second multiplexers are responsive (a) to connect the second data bit for coding by one of the second and third differential encoders if the first convolutional encoder output corresponds to a first binary level and (b) to connect the second data bit for coding by another one of the second and third differential encoders if the first convolutional encoder output corresponds to a second binary level and (2) for the fourth data bit, the first and second multiplexers are responsive (a) to connect the fourth data bit for coding by one of the second and third differential encoders if the second convolutional encoder output corresponds to a first binary level and (b) to connect the fourth data bit for coding by another one of the second and third differential encoders if the second convolutional encoder output corresponds to a second binary level.

4. The encoder of claim 1 wherein the multiplexers of the second encoding assembly are responsive to connect certain other input data bits for coding by one of the second and third differential encoders based on the binary levels of the first and second convolutional encoder outputs and the second multiplexer output of the first encoding assembly.

5. The encoder of claim 4 wherein the second encoding assembly receives a third data bit and a fifth data bit of a set of five input data bits, the third data bit preceding the fifth data bit in time, and wherein (1) for the third data bit, the first and second multiplexers are responsive (a) to connect the third data bit for coding by one of the second and third differential encoders if the first convolutional encoder output corresponds to a first binary level or if the first convolutional encoder output corresponds to a second binary level and the second multiplexer output of the first encoding assembly corresponds to the first binary level, and (b) to connect the third data bit for coding by another one of the second and third differential encoders if the first convolutional encoder output corresponds to the second binary level and the second multiplexer output of the first encoding assembly corresponds to the second binary level and (2) for the fifth data bit, the first and second multiplexers are responsive (a) to connect the fifth data bit for coding by one of the second and third differential encoders if the second convolutional encoder output corresponds to a first binary level or if the second convolutional encoder output corresponds to a second binary level and the second multiplexer output of the first encoding assembly corresponds to the first binary level, and (b) to connect the fifth data bit for coding by another one of the second and third differential encoders if the second convolutional encoder output corresponds to the second binary level and the second multiplexer output of the first encoding assembly corresponds to the second binary level.

6. The encoder of claim 1 wherein the convolutional encoder comprises a rate ½ convolutional encoder.

7. The encoder of claim 1 wherein the convolutional encoder comprises a rate n/(n+1) convolutional encoder.

8. The encoder of claim 1 wherein the first differential encoder and the second and third differential encoders of the encoding assemblies each comprises a binary differential encoder.

9. A method for encoding input data as trellis coded data, the method comprising the steps of:
providing a sequence of input data sets, each set including input data bits;
encoding a first input data bit to provide a first coded bit;
encoding the first coded bit to provide a pair of first coded output bits;
for each bit of a first pair of input data bits:
selecting a first data path from a pair of first data paths responsive to one of the pair of coded output bits;
providing one of the first pair of data bits on the selected first data path;
differentially encoding the one of the first pair of data bits as provided on the selected first data path to provide a second coded output bit, such that a pair of second coded output bits is provided corresponding to the first pair of data bits;
for each bit of a second pair of data input bits:
selecting a second data path from a pair of second data paths responsive to one of the pair of coded output bits;
providing one of the second pair of data bits on the selected second data path;
differentially encoding the one of the second pair of data bits as provided on the selected second data path to provide a third coded output bit, such that a pair of third coded output bits is provided corresponding to the second pair of data bits;
wherein for each input data set, one bit from each of the first, second and third coded output bits together represents a first symbol and another bit from each of the first, second and third coded output bits together represents a second symbol, each symbol corresponding to a phase point in an 8PSK signal constellation.

10. The method of claim 9 wherein the step of encoding the first input data bit comprises differentially encoding the first input data bit.

11. The method of claim 9 wherein the step of encoding the first coded bit comprises convolutionally encoding the first coded bit.

12. A decoder for decoding trellis coded data of the type wherein input data bits are encoded to three-bit symbols in 8PSK modulation, the decoder comprising:
a Viterbi decoder for providing an estimate of a first coded bit;
a first differential decoder having an input for receiving the first coded bit estimate;
a convolutional encoder having an input for receiving the first coded bit estimate, and first and second convolutional encoder outputs;
first and second decoding assemblies, each decoding assembly comprising:
a first multiplexer having a data input for receiving a pair of second bit estimates, first and second select inputs respectively connected to the first and second convolutional encoder outputs, and a pair of outputs;
a second differential decoder having an input connected to one of the first multiplexer outputs;
a third differential decoder having an input connected to another of the first multiplexer outputs;
a second multiplexer having a pair of data inputs each respectively connected to a different one of the second and third differential encoder outputs, first and second select inputs respectively connected to the first and second convolutional encoder outputs, and an output.

13. The decoder of claim 12 wherein the multiplexers of the first decoding assembly are responsive to connect certain input data bit estimates for coding by one of the second and third differential decoders based on the binary levels of the first and second convolutional encoder outputs.

14. The decoder of claim 13 wherein the first decoding assembly receives a second data bit estimate and a fourth data bit estimate of a set of five input data bits, the second data bit estimate preceding the fourth data bit estimate in time, and wherein (1) for the second data bit estimate, the first and second multiplexers are responsive (a) to connect the second data bit estimate for decoding by one of the second and third differential decoders if the first convolutional encoder output corresponds to a first binary level and (b) to connect the second data bit estimate for decoding by another one of the second and third differential decoders if the first convolutional encoder output corresponds to a second binary level and (2) for the fourth data bit estimate, the first and second multiplexers are responsive (a) to connect the fourth data bit estimate for decoding by one of the second and third differential decoders if the second convolutional encoder output corresponds to a first binary level and (b) to connect the fourth data bit estimate for decoding by another one of the second and third differential decoders if the second convolutional encoder output corresponds to a second binary level.

15. The decoder of claim 12 wherein the multiplexers of the second decoding assembly are responsive to connect certain other input data bit estimates for coding by one of the second and third differential decoders based on the binary levels of the first and second convolutional encoder outputs and the second multiplexer output of the first decoding assembly.

16. The decoder of claim 15 wherein the second encoding assembly receives a third data bit estimate and a fifth data bit estimate of a set of five input data bits, the third data bit estimate preceding the fifth data bit estimate in time, and wherein (1) for the third data bit estimate, the first and second multiplexers are responsive (a) to connect the third data bit estimate for decoding by one of the second and third differential decoders if the first convolutional encoder output corresponds to a second binary level or if the first convolutional encoder output corresponds to a first binary level and the second multiplexer output of the first decoding assembly corresponds to the second binary level, and (b) to connect the third data bit estimate for decoding by another one of the second and third differential decoders if the first convolutional encoder output corresponds to the first binary level and the second multiplexer output of the first decoding assembly corresponds to the first binary level and (2) for the fifth data bit estimate, the first and second multiplexers are responsive (a) to connect the fifth data bit estimate for decoding by one of the second and third differential decoders if the second convolutional encoder output corresponds to a second binary level or if the second convolutional encoder output corresponds to a first binary level and the second multiplexer output of the first decoding assembly corresponds to the second binary level, and (b) to connect the fifth data bit estimate for decoding by another one of the second and third differential decoders if the second convolutional encoder output corresponds to the first binary level and the second multiplexer output of the first decoding assembly corresponds to the first binary level.

17. The decoder of claim 12 wherein the convolutional encoder comprises a rate ½ convolutional encoder.

18. The decoder of claim 12 wherein the convolutional encoder comprises a rate n/(n+1) convolutional encoder.

19. The decoder of claim 12 wherein the first differential decoder and the second and third differential decoders of the decoding assemblies each comprises a binary differential decoder.

* * * * *